(12) United States Patent  
Tomita et al.

(10) Patent No.: US 8,583,192 B2  
(45) Date of Patent: Nov. 12, 2013

(54) BASE STATION DEVICE, MOBILE COMMUNICATION METHOD, AND MOBILE COMMUNICATION SYSTEM

(75) Inventors: Tetsuo Tomita, Kawasaki (JP); Takashi Sonobe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/006,558

(22) Filed: Jan. 14, 2011

(65) Prior Publication Data

US 2011/0105200 A1 May 5, 2011

Related U.S. Application Data

(63) Continuation of application No. PCT/JP2008/064156, filed on Aug. 6, 2008.

(51) Int. Cl.
*H04B 1/38* (2006.01)

(52) U.S. Cl.
USPC ....... 455/574; 455/41.2; 455/423; 455/67.11; 455/522; 455/127.1; 370/338; 370/332

(58) Field of Classification Search
USPC .......... 455/422.1, 41.2, 423, 69, 522, 126, 455/437, 115.1, 127.1, 436, 343.2, 450; 370/338, 332
See application file for complete search history.

(56) References Cited

U.S. PATENT DOCUMENTS

| 5,881,368 | A * | 3/1999 | Grob et al. ........................ 455/69 |
| 7,289,775 | B1 * | 10/2007 | King et al. ..................... 455/126 |
| 7,627,319 | B2 * | 12/2009 | Sato ............................... 455/437 |
| 2004/0005888 | A1 * | 1/2004 | Taketsugu .................. 455/422.1 |
| 2005/0054291 | A1 * | 3/2005 | Park ............................... 455/41.2 |
| 2006/0009211 | A1 * | 1/2006 | Sato ............................... 455/423 |
| 2006/0141939 | A1 * | 6/2006 | Nakada .......................... 455/69 |
| 2007/0123290 | A1 * | 5/2007 | Stenmark ...................... 455/522 |
| 2007/0263578 | A1 * | 11/2007 | Nakaso et al. ................ 370/338 |

FOREIGN PATENT DOCUMENTS

| JP | 02-285797 | 11/1990 |
| JP | 07336768 | 12/1995 |
| JP | 10-023519 | 1/1998 |
| JP | 2000511733 A | 9/2000 |
| JP | 2001156788 | 6/2001 |
| JP | 2002158609 | 5/2002 |
| JP | 2004040729 | 2/2004 |
| JP | 2007274208 | 10/2007 |
| WO | 2006057210 A1 | 6/2006 |

OTHER PUBLICATIONS

International Search Report dated Nov. 4, 2008, in corresponding International application No. PCT/JP2008/064156.
Notice of Rejection Japanese Office Action dated Oct. 9, 2012 received in Application No. 2010-523682.
Japanese Office Action dated May 22, 2012 issued in corresponding Application No. 2010-523682.

* cited by examiner

*Primary Examiner* — April G Gonzales
(74) *Attorney, Agent, or Firm* — Smith, Gambrell & Russell, LLP (57) ABSTRACT

A base station device for making communications with a mobile terminal includes a communication monitoring unit that monitors a communication situation between the base station device and the mobile terminal; and an operational-power control unit that causes, when the communication monitoring unit detects that no communications between the base station device and the mobile terminal have been made for a predetermined continuous period or longer, the base station device to operate at a power lower than a predetermined power.

7 Claims, 7 Drawing Sheets

BASE STATION DEVICE, MOBILE COMMUNICATION METHOD, AND MOBILE COMMUNICATION SYSTEM

CROSS-REFERENCE TO RELATED APPLICATION

This application is a continuation of International Application No. PCT/JP2008/064156, filed on Aug. 6, 2008, the entire contents of which are incorporated herein by reference.

FIELD

The embodiments discussed herein are directed to a base station device, a mobile communication method, and a mobile communication system.

BACKGROUND

A type of base station called a femto (Femto) base station is known. One example of a femto base station forms a femtocell that has a coverage area radius (several meters to several tens of meters) smaller than that of a macrocell (1 kilometer to several kilometers in radius). A femto base station is used in blind areas (e.g., areas above and below ground) and confined areas (e.g., households, offices, or facilities) for providing users with services.

With usage of a femto base station, radio waves can cover difficult-to-cover areas, such as areas inside a building. Although each area is small, if many base stations are installed and the number of mobile terminals per cell is decreased, connectability increases, which enforces the backbone for supporting service providing.

Japanese Laid-open Patent Publication No. 2007-274208 discloses a power-saving base station. Japanese Laid-open Patent Publication No. 2007-274208 describes a base station that calculates the number of mobile terminals that are currently in a position to make communications with the base station by comparing the identification number of any mobile terminal that has been detected by a sensor with a list of the identification numbers of mobile terminals able to make communications with the base station and shifts to a power saving mode in accordance with the number of the mobile terminals.

Japanese Laid-open Patent Publication No. 2002-158609 discloses a base station that reduces the power consumption by shifting to a power saving mode during a time zone when the line utilization rate decreases and then intermittently transmitting broadcast information, etc. Japanese Laid-open Patent Publication No. 7-336768 discloses a radio communication device in which, if the access frequency of a mobile terminal that is in the service area decreases, a first base station stops and a second base station increases both its output power and receiver sensitivity, thereby making communications with a mobile terminal in the radio area of the first station.

However, according to the above power-consumption reducing technologies, when a mobile terminal makes no communications with a base station but the mobile terminal is present in the femtocell that is formed by the base station, there is a possibility that the base station cannot shift to the power saving mode. This leads to a problem in that, even if the above power-consumption reducing technologies are used in a femto base station, there is a possibility that the power consumption of the femto base station is not decreased to its lowest. The problem related to the power consumption arises with not only femto base stations but also other base stations (macrocell base station).

SUMMARY

According to an aspect of an embodiment of the invention, a base station device for making communications with a mobile terminal includes a communication monitoring unit that monitors a communication situation between the base station device and the mobile terminal; and an operational-power control unit that causes, when the communication monitoring unit detects that no communications between the base station device and the mobile terminal have been made for a predetermined continuous period or longer, the base station device to operate at a power lower than a predetermined power.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

Preferred embodiments of the present invention will be explained with reference to accompanying drawings. The present invention is not limited to the embodiments.

Figure 1:
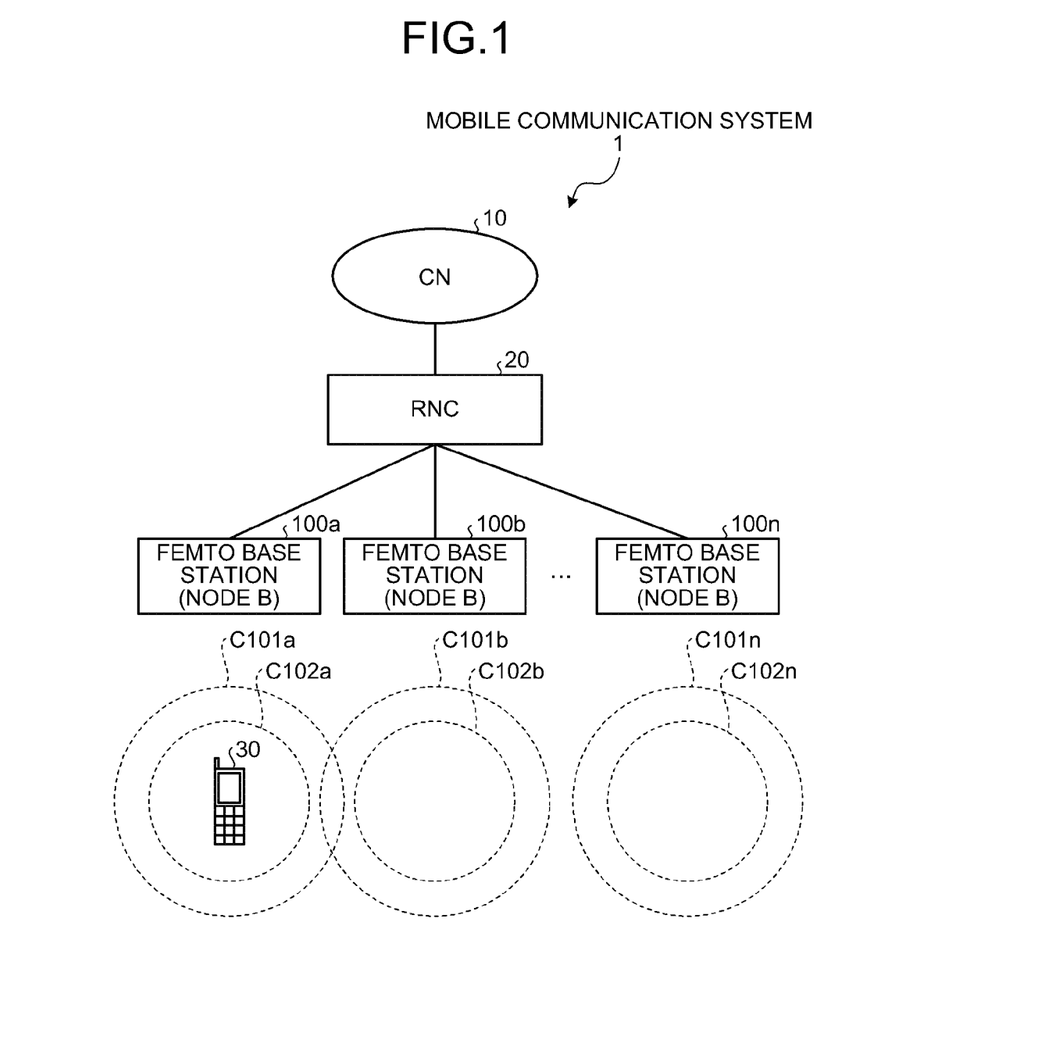
FIG. 1 is a diagram of an example of a mobile communication system according to the present embodiment that includes femto base stations.

A mobile communication system 1 is described below according to an embodiment that includes femto base stations 100a to 100n as example of base stations. FIG. 1 is a diagram of an example of the mobile communication system 1 according to the present embodiment that includes the femto base stations 100a to 100n. As illustrated in FIG. 1, the mobile communication system 1 includes a CN (Core Network: core network) 10, an RNC (Radio Network Controller: radio control device) 20, a UE (User Equipment: mobile terminal) 30, and the femto base stations 100a to 100n. In the following, if it is needless to distinguish the femto base stations 100a to 100n, they are collectively referred to as the femto base station 100.

The CN 10 is a large-capacity wide area network. The RNC 20 is a communication control device that manages a plurality of base stations and performs various control processes that are needed to make radio communications. Although, in the example of FIG. 1, the RNC 20 manages the femto base stations 100*a* to 100*n*, the RNC 20 can manage base stations that include both femto base stations and macro base stations. The UE 30 is a mobile radio communication device, such as a cellular phone terminal.

The femto base station 100 is a communication device that forms a femtocell that is a radio communication area having a predetermined area and provides the UE 30 that is in the femtocell thereof with a Radio Link (radio link).

The femto base station 100 used in the present embodiment allows access from some particular users and denies access from the other users. For example, the femto base station 100 conducts access control so that only it makes communications with only some particular UE. With the access control, the femto base station 100 can perform security check to prevent making connection with unspecified users. The access control conducted by the femto base station 100 will be described later. If the femto base station 100 is installed in a blind area and allows access from many unspecified users, the access control cannot be conducted.

The femto base station 100 according to the present embodiment has operation modes that include a power saving mode in which the power consumption is reduced and a normal mode in which the power consumption is not reduced. More particularly, when the femto base station 100 operates in the normal mode, the femto base station 100 checks the communication situation of the UE 30. If the femto base station 100 detects that no communications have been made with the UE 30 for a predetermined or longer continuous period, the femto base station 100 shifts to the power saving mode and decreases the operational power. As a result, for example, the output power of broadcast information transmitted from the femto base station 100 decreases. The broadcast information is transmitted in the normal mode at a power P1; however, the output power of the broadcast information decreases in the power saving mode to a power P2 (P1>P2), which narrows the area (transmittance range of the broadcast information). It is allowable to decrease, at the same time, other transmittance signals in the same manner, thereby reducing the total power necessary for the femto base station 100. When, during the power saving mode, the femto base station 100 detects start of communications with the UE 30, the femto base station 100 shifts to the normal mode and increases the operational power.

In the example illustrated in FIG. 1, if the femto base station 100*a* periodically makes communications with the UE 30, the femto base station 100*a* operates in the normal mode. Because, in this situation, the femto base station 100*a* operates at a predetermined power, the femto base station 100*a* outputs radio waves with a predetermined power to form a femtocell C101*a*. In contrast, if no communications have been made with the UE 30 for a predetermined or longer continuous period, the femto base station 100*a* shifts to the power saving mode. Because, in this situation, the femto base station 100*a* decreases the output power of radio waves, the femto base station 100*a* outputs radio waves with a power lower than the above predetermined power. Therefore, the femto base station 100*a* forms a femtocell C102*a* that has a radio communication area narrower than that of the femtocell C101*a*.

Similarly, if periodical communications have been made with the UE 30, the femto base station 100*b* forms a femtocell C101*b*; if no communications have been made with the UE 30 for a predetermined or longer continuous period, the femto base station 100*b* forms a femtocell C102*b*. Similarly, if the femto base station 100*n* periodically makes communications with the UE 30, the femto base station 100*n* forms a femtocell C101*n*; if no communications have been made with the UE 30 for a predetermined or longer continuous period, the femto base station 100*n* forms a femtocell C102*n*.

Figure 2:
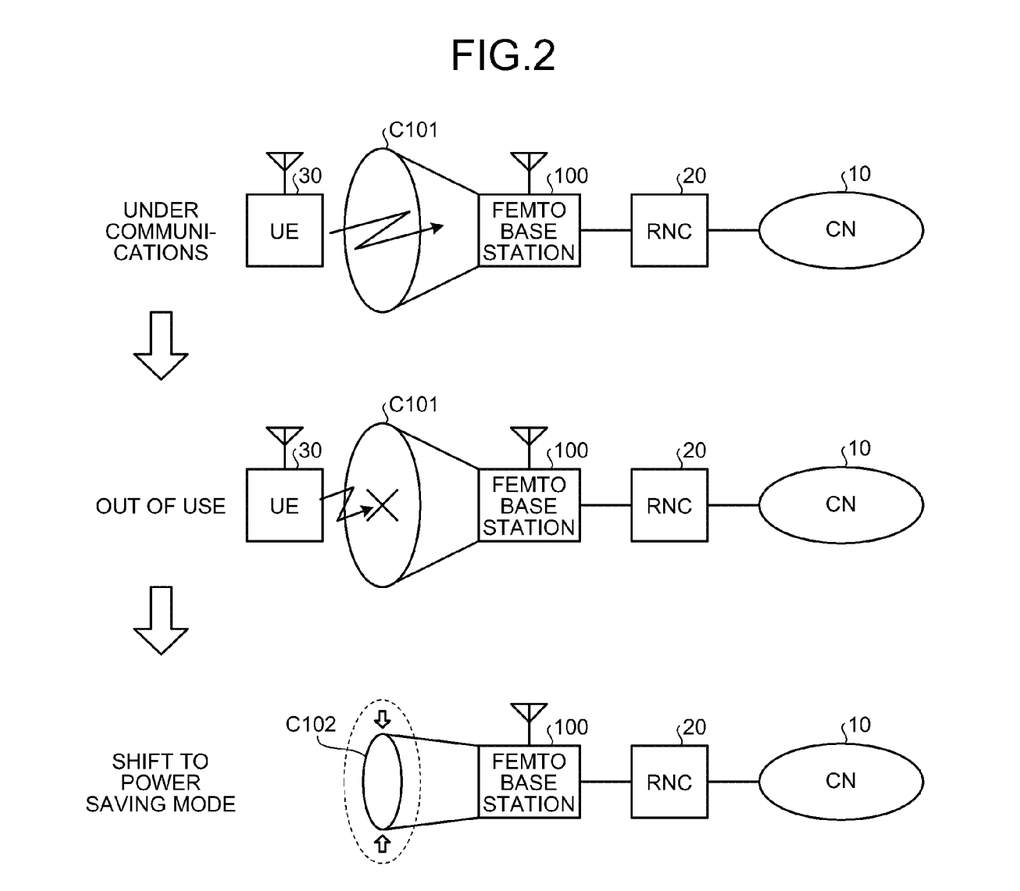
FIG. 2 is a diagram that illustrates the femto base station when it shifts to the power saving mode.
Figure 3:
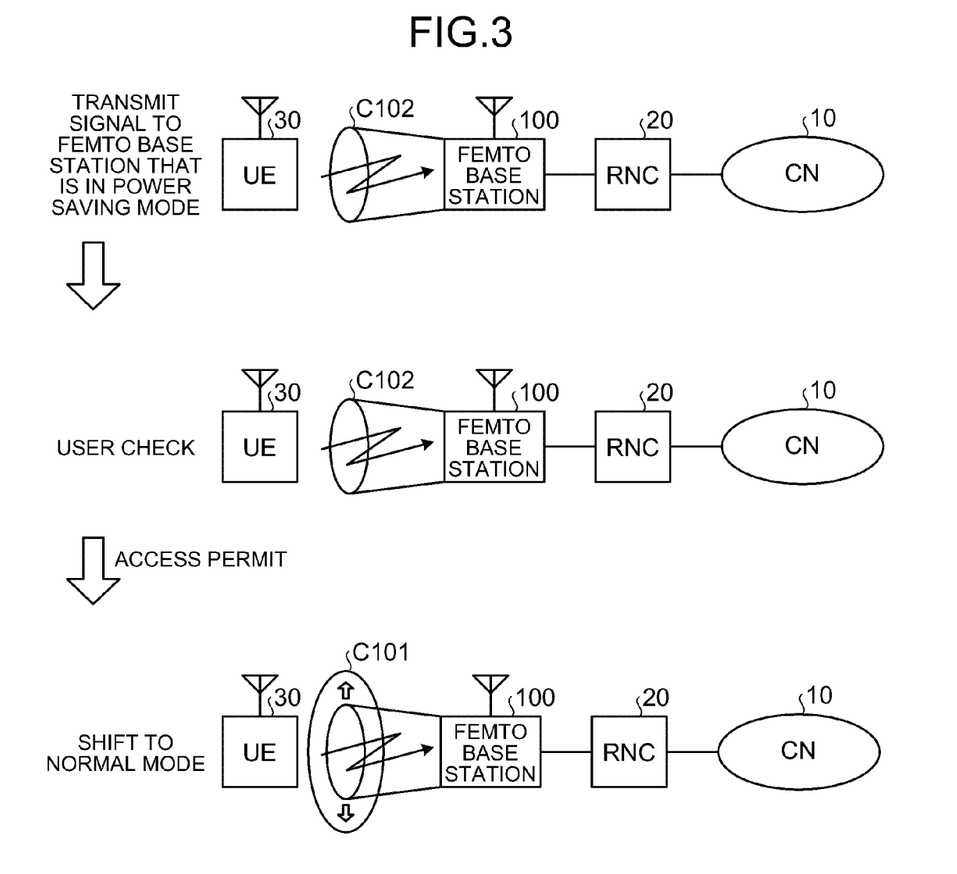
FIG. 3 is a diagram that illustrates the femto base station when it shifts to the normal mode.

The above-described process of shifting between the power saving mode and the normal mode is described in the concrete with reference to FIGS. 2 and 3. FIG. 2 is a diagram that illustrates the femto base station 100 when it shifts to the power saving mode. As illustrated in the upper section of FIG. 2, if the femto base station 100 makes communications with the UE 30, the femto base station 100 operates in the normal mode. Therefore, the femto base station 100 forms the femtocell C101 without decreasing the output power.

Suppose, as illustrated in the middle section of FIG. 2, that the femto base station 100 has made no communications with the UE 30 for a predetermined or longer continuous period. The expression "no communication has been made" herein includes both a situation where the UE 30 is not present in the femtocell C101 and a situation where the UE 30 is present in the femtocell C101 but makes no communications with the femto base station 100. In this situation, as illustrated in the lower section of FIG. 2, the femto base station 100 shifts to the power saving mode and decreases the operational power. With this configuration, the femto base station 100 forms the femtocell C102 that has the radio communication area narrower than that of the femtocell C101.

FIG. 3 is a diagram that illustrates the femto base station 100 when it shifts to the normal mode. The upper section of FIG. 3 illustrates an example where the femto base station 100 that is in the power saving mode receives a connection request from the UE 30. The connection request herein is, for example, an RRC (Radio Resource Control) CONNECTION REQUEST used in a third generation mobile communication system.

Upon receiving the connection request, the femto base station 100 determines, as illustrated in the middle section of FIG. 3, whether the UE 30 has an access right to access the femto base station 100. If the UE 30 has an access right to access the femto base station 100, as illustrated in the lower section of FIG. 3, the femto base station 100 makes communications with the UE 30 and shifts to the normal mode. In other words, the femto base station 100 increases the operational power to the predetermined power and forms the femtocell C101. On the other hand, if the UE 30 has no access right to access the femto base station 100, the femto base station 100 deletes the connection request that has been received from the UE 30 and operates as it remains in the power saving mode.

As described above, the femto base station 100 according to the present embodiment decreases, if no communications have been made with the UE 30 for a predetermined or longer continuous period, the operational power even when the UE 30 is in the femtocell thereof. With this configuration, the femto base station 100 according to the present embodiment can reduce the power consumption.

Moreover, the femto base station 100 according to the present embodiment does not stop outputting radio waves, which enables the femto base station 100 to operate in the normal mode to start communications with the UE 30 and, as a result, to operate at the predetermined power during communications with the UE 30.

The femto base station 100 having the above configuration is effective, for example, to form the femtocell indoors and outdoors during the normal mode and form the femtocell indoors during the power saving mode. More particularly, the femto base station 100 that is installed inside a household or an office often forms the femtocell in an area that includes not only indoors but also outdoors. Accordingly, if the femto base station 100 forms the femtocell in the above-described manner, the user can access the femto base station 100 from indoors and outdoors when communications are made from indoors and outdoors using the femto base station 100. On the other hand, the user can access the femto base station 100 from only indoors when the femto base station 100 is out of use. Once the user uses the femto base station 100 from indoors, the user can access the femto base station 100 from indoors and outdoors, again.

Figure 4:
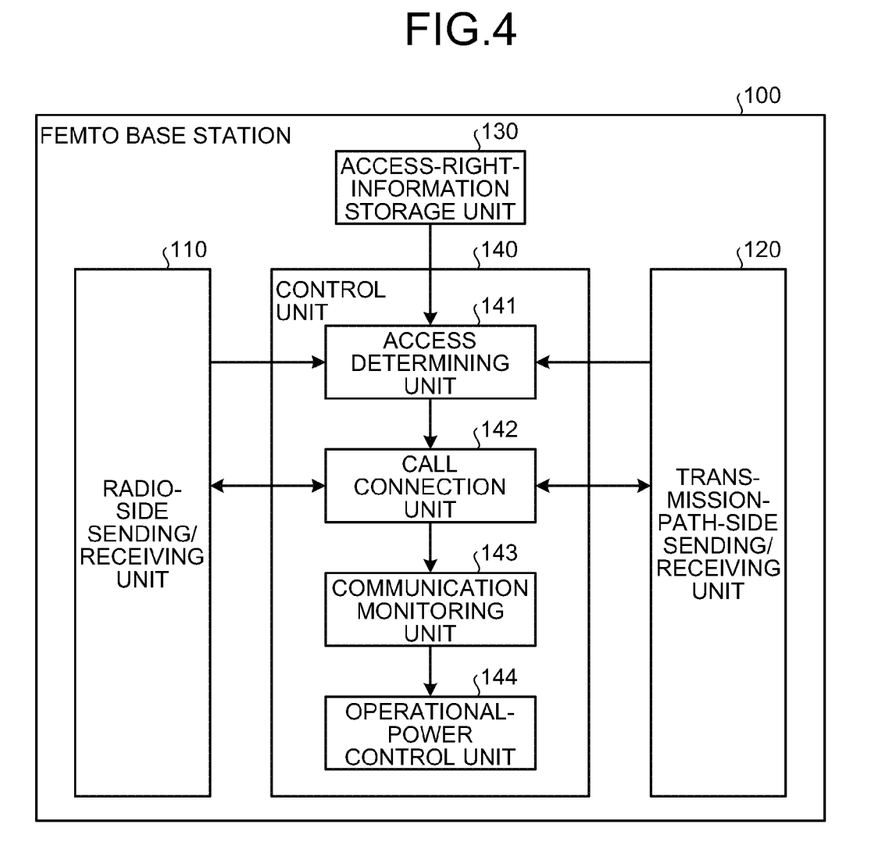
FIG. 4 is a diagram of the configuration of the femto base station illustrated in FIG. 1.

The configuration of the femto base station 100 illustrated in FIG. 1 is described below. FIG. 4 is a diagram of the configuration of the femto base station 100 illustrated in FIG. 1. As illustrated in FIG. 4, the femto base station 100 includes a radio-side sending/receiving unit 110, a transmission-path-side sending/receiving unit 120, an access-right-information storage unit 130, and a control unit 140.

The radio-side sending/receiving unit 110 sends/receives various pieces of information to/from the UE 30. For example, the radio-side sending/receiving unit 110 receives a connection request from the UE 30. The transmission-path-side sending/receiving unit 120 sends/receives various pieces of information to/from a higher-level device, such as the RNC 20. For example, the transmission-path-side sending/receiving unit 120 sends the connection request that has been received from the UE 30 to the RNC 20.

Figure 5:
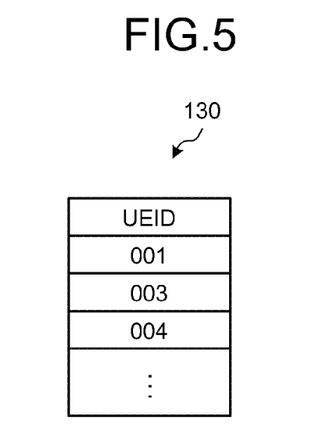
FIG. 5 is a diagram of an example of the access-right-information storage unit.

The access-right-information storage unit 130 stores therein information about UE that is permitted to make communication with the femto base station 100. FIG. 5 is a diagram of an example of the access-right-information storage unit 130. As illustrated in FIG. 5, the access-right-information storage unit 130 has items that include UEID. The UEID is identification information for identifying UE. In the example illustrated in FIG. 5, UE that has the UEID any of "001", "003", and "004" has the access right to access the femto base station 100.

The control unit 140 controls the femto base station 100. The control unit 140 includes, as units related to the operation-mode shifting process performed by the femto base station 100 according to the present embodiment, an access determining unit 141, a call connection unit 142, a communication monitoring unit 143, and an operational-power control unit 144.

The access determining unit 141 determines whether the UE 30 has the access right to access the femto base station 100. More particularly, upon receiving a connection request from the UE 30, the access determining unit 141 determines whether the UEID of the UE 30 is stored in the access-right-information storage unit 130. If the UEID of the UE 30 is stored in the access-right-information storage unit 130, the access determining unit 141 determines that the UE 30 has the access right to access the femto base station 100. On the other hand, if the UEID of the UE 30 is not stored in the access-right-information storage unit 130, the access determining unit 141 determines that the UE 30 has no access right to access the femto base station 100.

For example, the access-right-information storage unit 130 is in the state as illustrated in FIG. 5. In this situation, if a connection request is received from the UE that has the UEID "001", the access determining unit 141 determines, because the UEID "001" is stored in the access-right-information storage unit 130, that the UE has the access right to access the femto base station 100. Moreover, if a connection request is received from the UE that has, for example, the UEID "002", the access determining unit 141 determines, because the UEID "002" is not stored in the access-right-information storage unit 130, that the UE has no access right to access the femto base station 100.

If the mobile communication system is a third generation mobile communication system, the item Initial UE identity in the connection request (RRC CONNECTION REQUEST) contains UEID. In this situation, the access determining unit 141 performs the access determining process using the UEID that is included in Initial UE identity.

When the call connection unit 142 receives a connection request from the UE 30 that is present in the femtocell that is formed by the femto base station 100, the call connection unit 142 conducts call connection. More particularly, if the UE 30 that sends the connection request is determined by the access determining unit 141 to have the access right to access the femto base station 100, the call connection unit 142 conducts call connection to connect the femto base station 100 to the UE 30. In the above example, if a connection request is received from the UE that has the UEID "001", the call connection unit 142 conducts the call connection to connect the femto base station 100 to the UE 30. On the other hand, if a connection request is received from the UE that has the UEID "002", the call connection unit 142 does not conduct the call connection for the UE.

The communication monitoring unit 143 monitors the communication situation between the femto base station 100 and the UE 30. More particularly, if the communication monitoring unit 143 detects that the femto base station 100 operates in the normal mode but no communications have been made with the UE 30 for a predetermined or longer continuous period, the communication monitoring unit 143 causes the femto base station 100 to operate in the power saving mode. On the other hand, if the communication monitoring unit 143 detects that the femto base station 100 operates in the power saving mode but communications are made (communications starts) with the UE 30, the communication monitoring unit 143 causes the femto base station 100 to operate in the normal mode.

The operational-power control unit 144 controls the operational power of the femto base station 100. More particularly, if the femto base station 100 operates in the normal mode, the operational-power control unit 144 causes the femto base station 100 to operate at a predetermined power. In this situation, the femto base station 100 transmits the broadcast information, etc., by outputting a radio wave with the predetermined power. On the other hand, if the femto base station 100 operates in the power saving mode, the operational-power control unit 144 causes the femto base station 100 to operate at a power lower than the above predetermined power. In this situation, the femto base station 100 transmits the broadcast information, etc., by outputting the radio wave with the power lower than the predetermined power.

Figure 6:
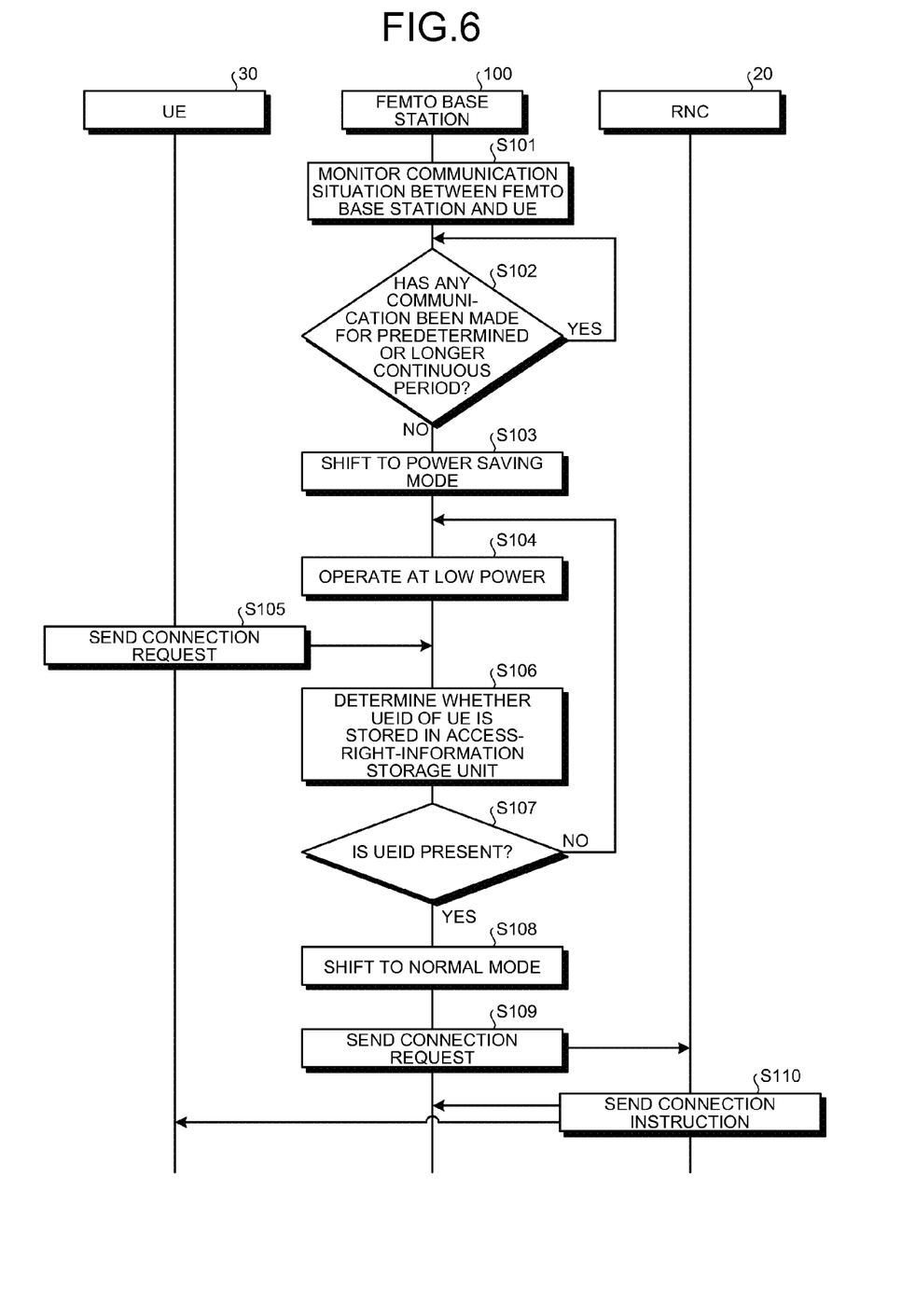
FIG. 6 is a sequence diagram that illustrates the flow of processes performed by the units included in the mobile communication system.

The flow of processes performed by the units included in the mobile communication system 1 that is illustrated in FIG. 1 is described below. FIG. 6 is a sequence diagram that illustrates the flow of processes performed by the units included in the mobile communication system 1. It is assumed, in FIG. 6, that the femto base station 100 operates in the normal mode.

As illustrated in FIG. 6, the communication monitoring unit 143 of the femto base station 100 that operates in the normal mode monitors the communication situation between the femto base station 100 and the UE 30 (Step S101). If the communication monitoring unit 143 determines that no communications have been made between the femto base station 100 and the UE 30 for a predetermined or longer continuous period (No at Step S102), the communication monitoring unit 143 causes the femto base station 100 to operate in the power saving mode (Step S103).

After that, the operational-power control unit 144 decreases the operational power of the femto base station 100 (Step S104). As a result, the femto base station 100 transmits the broadcast information, etc., by outputting the radio wave with a power lower than the predetermined power.

After that, the UE 30 sends a connection request to the femto base station 100 (Step S105). When the femto base station 100 receives the connection request, the access determining unit 141 determines whether the UEID of the UE 30 is stored in the access-right-information storage unit 130 (performs the authentication process) (Step S106).

If the UEID of the UE 30 is stored in the access-right-information storage unit 130 (Yes at Step S107), the access determining unit 141 determines that the UE 30 has the access right to access the femto base station 100. In this situation, the communication monitoring unit 143 detects that communications are made (communications start) with the UE 30 and causes the femto base station 100 to operate in the normal mode (Step S108). As a result, the femto base station 100 operates at the predetermined power. The UE 30 can further include a close-range communication unit (e.g., infrared communication unit) and the femto base station 100 can also include an infrared communication unit: the femto base station receives an infrared ray from the UE 30 and reduces the power consumption to a level so that a predetermined signal (e.g., power-on signal) is detectable. It is also allowable that when the operation unit of the UE 30 is manipulated and a predetermined signal (power-on signal) is received by the femto base station 100, the signal is detected and the above-described authentication process is performed using the infrared ray between the femto base station and the UE: if the authentication is completed, the femto base station shifts to the normal mode. It is also allowable of course that, when receiving a predetermined signal (power-on signal), the femto base station shifts to the normal mode, transmits the broadcast information, etc., using a radio signal with the normal power, and performs the above authentication process.

After that, the call connection unit 142 of the femto base station 100 sends the connection request that has been received from the UE 30 to the RNC 20 (Step S109). Upon receiving the connection request, the RNC 20 sends connection instructions to both the UE 30 and the femto base station 100 (Step S110).

On the other hand, if the UEID of the UE 30 is not stored in the access-right-information storage unit 130 (No at Step S107), the access determining unit 141 determines that the UE 30 has no access right to access the femto base station 100. In this situation, the femto base station 100 keeps operating by the power lower than the predetermined power (Step S104).

As described above, when no communications have been made with the UE 30 for a predetermined or longer continuous period, the femto base station 100 according to the present embodiment decreases the operational power, which reduces the power consumption.

Although, in the above embodiments, when a connection request is received from the UE 30, the femto base station 100 shifts from the power saving mode to the normal mode, the femto base station 100 can be configured to shift from the power saving mode to the normal mode when a connection request to connect the femto base station 100 to the UE 30 is received from the RNC 20. This embodiment is described in the concrete with reference to FIG. 7.

Figure 7:
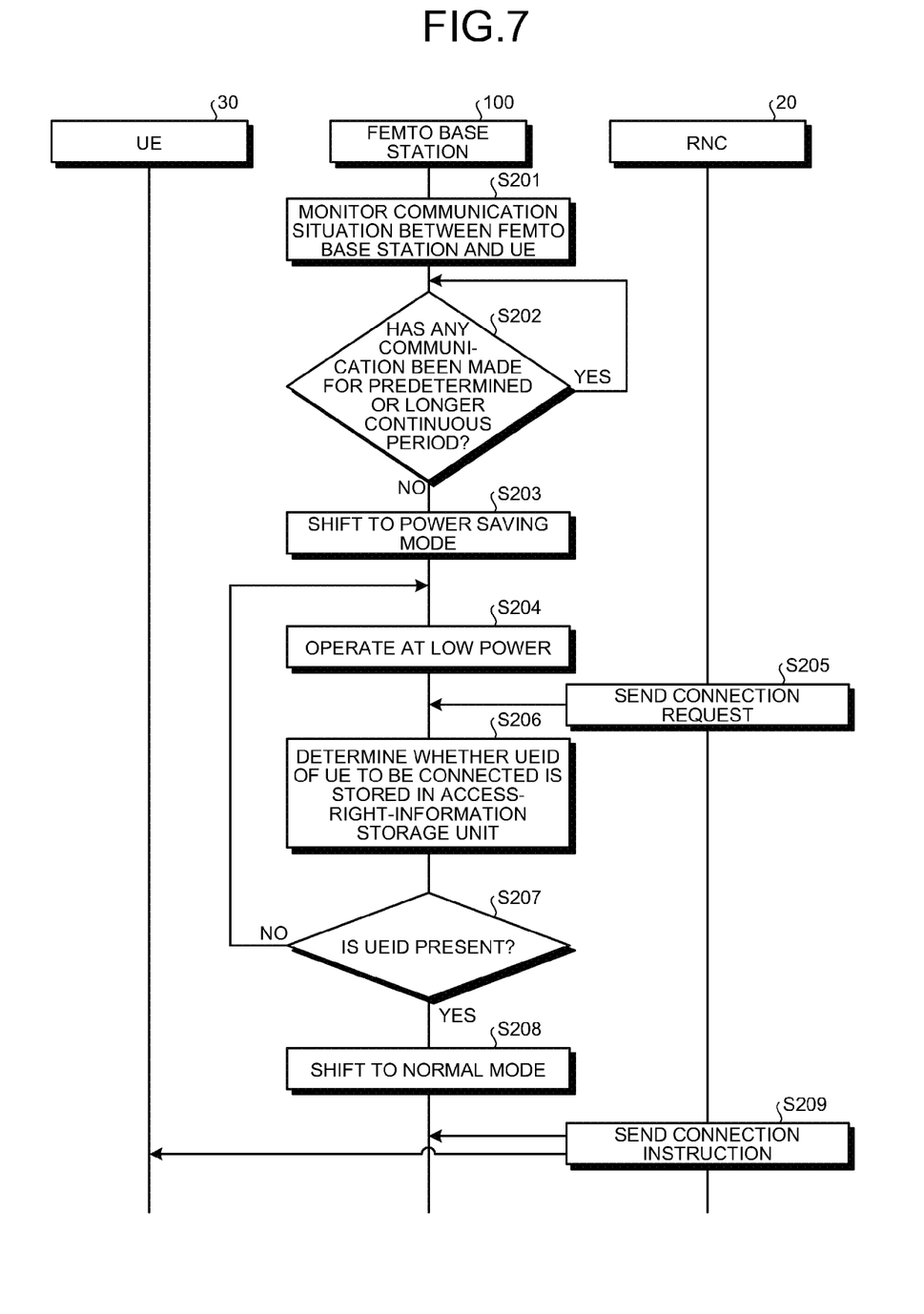
FIG. 7 is a sequence diagram that illustrates the flow of processes performed by the units included in the mobile communication system when a connection request is received from the RNC.

FIG. 7 is a sequence diagram that illustrates the flow of processes performed by the units included in the mobile communication system 1 when a connection request is received from the RNC 20. It is assumed, in FIG. 7, that the femto base station 100 operates in the normal mode. In the following, the same processing procedure as that illustrated in FIG. 6 (Steps S201 to S204, S208, and S209) is not described.

As illustrated in FIG. 7, the communication monitoring unit 143 of the femto base station 100 that operates in the normal mode monitors the communication situation between the femto base station 100 and the UE 30 (Step S201). If the communication monitoring unit 143 determines that no communications have been made between the femto base station 100 and the UE 30 for a predetermined or longer continuous period (No at Step S202), the communication monitoring unit 143 causes the femto base station 100 to operate in the power saving mode (Step S203). After that, the operational-power control unit 144 decreases the operational power of the femto base station 100 (Step S204).

After that, the RNC 20 sends a connection request to the femto base station 100 to connect the femto base station 100 to the UE 30 (Step S205). When the femto base station 100 receives the connection request, the access determining unit 141 determines whether the UEID of the UE 30 to be connected is stored in the access-right-information storage unit 130 (Step S206).

If the UEID of the UE 30 is stored in the access-right-information storage unit 130 (Yes at Step S207), the communication monitoring unit 143 detects that communications are made with the UE 30 and causes the femto base station 100 to operate in the normal mode (Step S208). As a result, the femto base station 100 operates at the predetermined power. The RNC 20 then sends connection instructions to both the UE 30 and the femto base station 100 (Step S209).

On the other hand, if the UEID of the UE 30 is not stored in the access-right-information storage unit 130 (No at Step S207), the access determining unit 141 determines that the UE 30 has no access right to access the femto base station 100. In this situation, the femto base station 100 keeps operating by the power lower than the predetermined power (Step S204).

Although, in the above embodiments, the femto base station that is installed inside a household or an office reduces the power consumption, a macro base station that is allowed to have the power saving mode can perform the above operation-mode shifting process. This also enables the macro base station to reduce the power consumption.

Moreover, although the third generation mobile communication system is used in the above embodiments, the femto base station 100 according to the present embodiment can be used in a mobile communication system different from the third generation mobile communication system. For example, the femto base station 100 according to the present embodiment can be used in a 3.9-th generation mobile communication system (LTE: Long Term Evolution) in which both the RNC and the base station are included in the same device. In this situation, the above operation-mode shifting process performed by the femto base station 100 is performed by the device that includes both the RNC and the base station.

Moreover, the configuration of the femto base station 100 illustrated in FIG. 4 can be modified variously without departing from the scope. For example, if the function of the control unit 140 of the femto base station 100 is implemented as software and a computer executes it, the same function as that of the femto base station 100 is achieved. In the following, an example of a computer is illustrated that executes a femto-base-station control program 1071 to implement the function of the control unit 140 as software.

Figure 8:
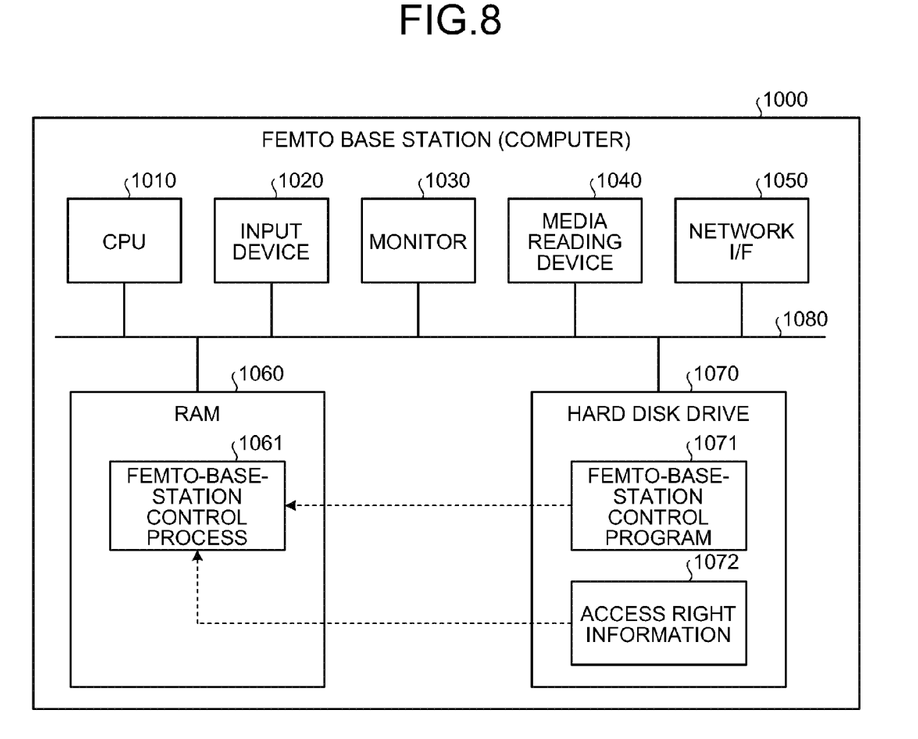
FIG. 8 is a diagram of the configuration of a computer that executes a femto-base-station control program.

FIG. 8 is a diagram of the configuration of a computer 1000 that executes the femto-base-station control program 1071. As illustrated in FIG. 8, the computer 1000 that functions as a femto base station includes a CPU (Central Processing Unit) 1010 that performs various computing processes, an input device 1020 that receives data from a user, a monitor 1030 that displays various pieces of information, a media reading device 1040 that reads programs or the like from a recording medium, a network interface 1050 that sends/receives data to/from another computer via a network, a RAM (Random Access Memory) 1060 that temporarily stores therein various pieces of information, and a hard disk drive 1070, all of which being connected via a bus 1080.

The hard disk drive 1070 stores therein the femto-base-station control program 1071 having the same function as that of the control unit 140 illustrated in FIG. 4 and access right information 1072 that corresponds to various data that is stored in the access-right-information storage unit 130 illustrated in FIG. 4. The access right information 1072 can be separated as appropriately and part of it can be stored in another computer that is connected to the computer 1000 via a network.

When the CPU 1010 reads the femto-base-station control program 1071 from the hard disk drive 1070 and loads it on the RAM 1060, the femto-base-station control program 1071 functions as a femto-base-station control process 1061. The femto-base-station control process 1061 loads information or the like that has been read from the access right information 1072 on an area of the RAM 1060 that is assigned thereto as appropriately and performs various data processes in accordance with the loaded data or the like.

The above femto-base-station control program 1071 cannot be always stored in the hard disk drive 1070: the computer 1000 can read this program that is stored in a recording medium, such as a CD-ROM, and executes it. It is also allowable to store this program in another computer (or a server), etc., that is connected to the computer 1000 via a public line, the Internet, a LAN (Local Area Network), a WAN (Wide Area Network), etc., and then the computer 1000 reads the program from the device and executes it.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device for making communications with a mobile terminal, the base station device comprising:
    a communication monitoring unit that monitors a communication situation between the base station device and the mobile terminal; and
    an operational-power control unit that causes, when the communication monitoring unit detects that no communication between the base station device and the mobile terminal being present in a communication area which the base station device forms have been made for a predetermined continuous period or longer while the base station device is in a first mode where the base station device transmits broadcast information at a first power, the base station device to shift to a second mode where the base station device transmits the broadcast information at a second power lower than the first power, the communication area being formed both indoors and outdoors in the first mode, and the communication area being formed only indoors in the second mode.

2. The base station device according to claim 1, wherein, when a connection request is received from the mobile terminal while the base station device is in the second mode, the operational-power control unit causes the base station device to shift to the first mode.

3. The base station device according to claim 1, wherein, the operational-power control unit causes the base station device to shift to the first mode when a connection request is received from the mobile terminal that is permitted to access the base station device while the base station device is in the second mode, and causes the base station device to continue the second mode when the connection request is received from the mobile terminal that is not permitted to access the base station device while the base station device is in the second mode.

4. The base station device according to claim 1, wherein, when a connection request is received from a higher-level device to connect the base station device to the mobile terminal while the base station device is in the second mode, the operational-power control unit causes the base station device to shift to the first mode.

5. The base station device according to claim 1, wherein, the operational-power control unit causes the base station device to shift to the first mode when a connection request is received from a higher-level device to connect the base station device to the mobile terminal that is permitted to access the base station device while the base station device is in the second mode, and causes the base station device to continue the second mode when the connection request is received from the higher-level device to connect the base station device to the mobile terminal that is not permitted to access the base station device while the base station device is in the second mode.

6. A mobile communication method performed by a base station device that communicates with a mobile terminal, the mobile communication method comprising:
    monitoring a communication situation between the base station device and the mobile terminal; and
    causing, when it is detected at the monitoring that no communication between the base station device and the mobile terminal being present in a communication area which the base station device forms have been made for a predetermined continuous period or longer while the base station device is in a first mode where the base station device transmits broadcast information at a first power, the base station device to shift to a second mode where the base station device transmits the broadcast information at a second power lower than the first power, the communication area being formed both indoors and outdoors in the first mode, and the communication area being formed only indoors in the second mode.

7. A mobile communication system comprising:
    a base station device; and
    a mobile terminal that makes communications with the base station device, wherein
    the base station device includes:
    a communication monitoring unit that monitors a communication situation between the base station device and the mobile terminal; and
    an operational-power control unit that causes, when the communication monitoring unit detects that no communication between the base station device and the mobile terminal being present in a communication area which the base station device forms have been made for a predetermined continuous period or longer while the base station device is in a first mode where the base station device transmits broadcast information at a first power, the base station device to shift to a second mode where the base station device transmits the broadcast information at a second power lower than the first power, the communication area being formed both indoors and outdoors in the first mode, and the communication area being formed only indoors in the second mode.

* * * * *